United States Patent Office 3,271,478
Patented Sept. 6, 1966

3,271,478
POLYMERIZABLE TRIAZINES AND
PRODUCTS THEREOF
Gaetano F. D'Alelio, South Bend, Ind., assignor to Dal Mon Research Co., Cleveland, Ohio, a corporation of Delaware
No Drawing. Filed Jan. 24, 1963, Ser. No. 253,758
11 Claims. (Cl. 260—898)

This invention relates to new monomers and to new polymeric materials derived therefrom and is particularly directed to the polymerization products obtained by polymerizing a mass comprising a triazinyl compound, as defined hereinafter, in the presence or absence of other ethylenic compounds especially acrylonitrile. The invention also relates to compositions of these polymerization products adapted to the formation of shaped articles, in many cases to molecularly oriented shaped articles, particularly to fibers, threads, bristles, monofilaments, etc., hereinafter referred to as fibers, and other shaped articles such as films and the like, which articles show improved dyeing properties.

It has been known for some time that certain copolymers of acrylonitrile may be adapted to the preparation of shaped articles, such as films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or organic dispersions of dyes. It has been proposed that improvement in dye susceptibility can be obtained by the use of itaconic acid in small amounts as copolymerizing monomer in the preparation of acrylonitrile polymers. However, the polymer products obtained thereby have a tendency to crosslink upon standing at temperatures of at least about 70–80° C., or upon spinning from hot solutions. Such crosslinking causes spoilation of material by gelation during storage, embrittlement of fibers, fouling of spinning jets, and other production difficulties.

Recent attempts have bene made to improve the dyeability of acrylonitrile polymers by using various polymerizable amine and amide compounds as copolymerizing monomers. However, it has been found that these comonomers cause undesirable salt formation and the products have a tendency to discolor upon exposure to light.

In accordance with the present invention, new triazinyl compounds, as defined hereinafter, have been found. It has been found further that these triazinyl compound are polymerizable, either by themselves or in conjunction with other copolymerizable ethylenic compounds. Thus it has been found that these triazinyl compounds can be polymerized per se to form useful homopolymers. In addition it has been found that these triazinyl compounds can be polymerized with copolymerizable ethylenic compounds to form useful copolymers. Thus, in accordance with this invention, valuable polymerization products can be prepared by polymerizing a mass comprising one or more such triazinyl compounds, either in the presence or absence of other ethylenic copolymerizable compounds or their polymers. It has been found further that particularly valuable polymerization products having improved dyeing properties and improved resistance to salt formation and to discoloration in light are obtained by the polymerization of polymerizable masses comprising acrylonitrile and these triazinyl compounds, either in the presence or absence of other copolymerizable ethylenic compounds. It has been found further that valuable mixtures can be made comprising polymers of these triazinyl compounds and polymers of acrylonitrile. As used herein, the terms "polymers" and "polymerization products," unless specifically indicated otherwise, are intended to include copolymers and copolymerization products respectively.

The triazinyl compounds of this invention, hereinafter referred to as "triazine monomers," are represented by the following general formula:

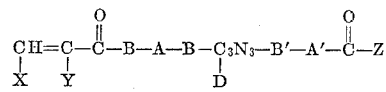

wherein X is hydrogen, cyano, —C(O)OR″,

—C(O)NR′$_2$ or

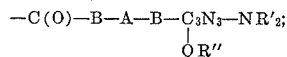

Y is hydrogen, an alkyl group of no more than 6 carbon atoms, or, when X is hydrogen, can also be chloro, fluoro, bromo, iodo, —CH$_2$C(O)OR″, —CH$_2$C(O)NR′$_2$, or

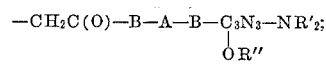

B is oxygen or —N(R″)—; A is a divalent hydrocarbon radical having at least two carbon atoms between said valencies; and when that B to which the

group is attached is oxygen, that part of A to which B is attached is aliphatic; R is hydrogen or a monovalent hydrocarbon radical; R′ is hydrogen or a monovalent hydrocarbon radical, or two R's are a divalent hydrocarbon or hetero group with both valencies attached to the N; R″ is hydrogen, a monovalent hydrocarbon radical or a divalent hydrocarbon with the other valency connected to A or to the second B group when the latter also represents —N(R)— so as to form a heterocyclic group; C$_3$N$_3$ represents the symmetrical triazine (1,3,5-triazine) nucleus; B′ is B or

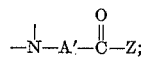

A′ is a divalent hydrocarbon radical; Z is OR or NR′$_2$; D is any monovalent group not containing a polymerizable ethylenic group, including R, OR, NR′$_2$, B′A′COZ, etc.; and the hydrocarbon groups of A, R, R′ and R″ can have chloro, fluoro, alkoxy, aryloxy and acyloxy substituents thereon.

The polymeric products of this invention have repeating units in the polymer molecule of the formula:

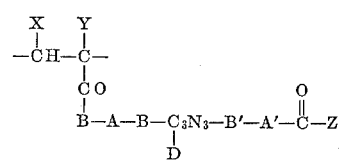

wherein X, Y, B, A, C$_3$N$_3$, D, B′ A′ and Z are as defined above.

The alkoxy, aryloxy and acyloxy groups for A, R, R′ and R″ are advantageously radicals of no more than about ten carbon atoms such as methoxy, ethoxy, butoxy, pantoxy, octoxy, phenylmethoxy, phenylethoxy, acetoxy, propionoxy, butyroxy, valeroxy, capryloxy, benzoxy, phenylacetoxy, toluoxy, etc. Other groups can be substituted on A, R, R' and R'' provided they are inert during the preparation and use of the triazine monomers. Moreover, A can have unsaturation therein of relatively inactive type such as —CH$_2$—CH=CH—CH$_2$—;

Typical examples of A include the following radicals

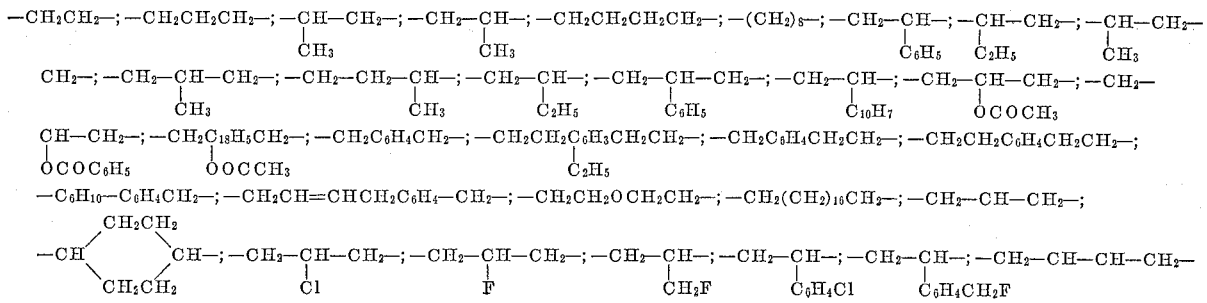

When that B to which the

group is attached is oxygen, that part of A to which that B is attached is preferably aliphatic. When that B is —N(R)—, both aliphatic and aromatic portions in A are suitable for connection to N. Accordingly, A also includes as typical groups: —C$_6$H$_4$—; —C$_{10}$H$_6$—;

—C$_6$H$_4$—C$_6$H$_4$—; —CH$_2$C$_6$H$_4$—; —CH$_2$CH$_2$C$_6$H$_4$—
—CH$_2$—C$_{10}$H$_5$—; etc.

The radical R can be various groups of the type indicated above including methyl, ethyl, propyl, isopropyl, n-butyl, sec-butyl, amyl, hexyl, decyl, chloromethyl, chloroethyl, fluoropropyl, cyclohexyl, methylcyclopentyl, propyl-cyclopentyl, amyl-cyclopentyl, methyl cyclohexyl, di-methyl-cyclohexyl, chloro-cyclohexyl, phenyl, chlorophenyl fluorophenyl, xenyl, naphthyl, tolyl, chloro-tolyl, fluoro-tolyl, xylyl, ethyl-phenyl, propyl-phenyl, isopropyl-phenyl, benzyl, chloro-benzyl, phenethyl, phenyl-propyl, phenyl-butyl, acetoxy-ethyl, acetoxy-phenyl, acetoxy-benzyl, acetoxy-tolyl, acetoxy-cyclohexyl, chlorophenoxy-ethyl, acetoxy-propyl, acetoxy-isopropyl, methoxy-propyl, ethoxy-propyl, methoxy-phenyl, methoxy-benzyl, methoxy-tolyl, methoxy-cyclohexyl, etc.

Typical R' groups include the hydrocarbon groups listed above for R, and two R' groups can be a divalent aliphatic or hetero- group linked to form with the nitrogen a heterocyclic group such as the piperidyl, piperazinyl or morpholino group.

Typical R'' groups include the monovalent groups listed above for R' and also the R'' groups attached to a nitrogen connected to A can be connected to form with A, or when a second nitrogen is connected to A, with the other nitrogen and A, a heterocyclic group such as a piperazinyl or piperidyl group.

While other hydrocarbon and substituted hydrocarbon groups are also effective as R, R' and R'' groups, the groups indicated above are preferred for reasons of availability and economy. Although many of the illustrations herein for NR$_2$' groups show similar R' groups such as in dimethylamino, etc., it is intended that mixed groups are also covered hereby, that is methyl-ethylamino, etc., and that one NR$_2$' can be dimethylamino, etc., and where there is another NR$_2$' group in the same compound, it can be different, such as diethylamino, etc.

It has been found that A, R, R' and R'' groups of the sizes indicated above give the most effective results. While larger groups are also effective, triazine monomers containing such larger groups act more sluggishly and generally best results are obtained when such groups each have less than twelve carbon atoms.

Triazinyl amines from which the triazinyl portion of the above formula can be derived are those symmetrical triazines (1,3,5-triazine) whose nucleus is

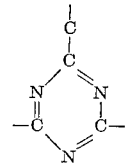

and to which an amidifiable aminoalkyl hydrocarbon group or esterifiable hydrocarbon group is attached through an amino or ether linkage. This triazine nucleus is sometimes represented herein as C$_3$N$_3$. Triazinyl compounds which can be used in preparing the compositions of this invention have the structure

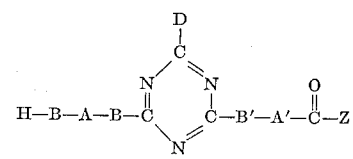

wherein B, A, D, B', A', and Z are as defined above. Methods for preparing such intermediate compounds are known in the art. The monomers are prepared by forming the acrylic, alpha-methacrylic, beta-cyanoacrylic, alpha-ethacrylic, itaconic, maleic, fumaric, mesaconic, citraconic, etc., ester and amide derivatives of the above intermediates to give products of the above general formula.

The monomers used in the practice of the invention can be formed by reacting the triazine compounds containing either an esterifiable hydroxyl group or an amino group containing an active hydrogen with a polymerizable ethylenic carboxylic acid or anhydride such as itaconic acid, itaconic acid anhydride, itaconic acid mono-esters, itaconic acid monoamides, acrylic acid, alpha-methacrylic acid, beta-cyano-acrylic acid, maleic acid, maleic acid monoesters, maleic acid monoamides, corresponding mesaconic and citraconic acid derivatives, etc. The acyl chlorides, or other halides, of these acids can be used also. When dibasic acids of the anhydrides thereof are used, one of the carboxylic groups can be esterified before the triazinyl amidation of triazinyl esterification. An amide group similarly can be introduced before the triazinyl amidation or esterification. Likewise when the dibasic acids or anhydrides thereof are used, the derivative can be carried either to the mono stage only, the remaining carboxylic acid group can then be esterified or amidated as desired. In these and other ways known to those skilled in the art monomers of this invention can be prepared.

The monomers of this invention are readily prepared by reacting the corresponding acid, acid anhydride or acid chloride with the corresponding triazine compound represented by the symbol K—H, e.g., (a) $CH_2=CHCOOH + K—H \rightarrow CH_2=CHCOK + H_2O$ (b) 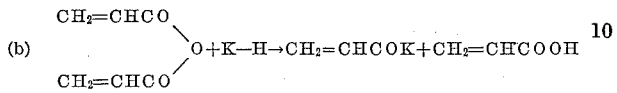 $+ K—H \rightarrow CH_2=CHCOK + CH_2=CHCOOH$ (c) $CH_2=CHCOCl + K—H + R_3N \rightarrow$
$CH_2=CHCOK + R_3N \cdot HCl$ The syntheses of the monomers of this invention are illustrated in Example I.

The invention will be more fully described by the following examples. The invention is not to be regarded, however, as restricted in any way by these examples and they are to serve merely as illustrations. In these examples and throughout the specification, "parts" and "percentages" shall mean parts by weight and percentages by weight unless specifically provided otherwise.

EXAMPLE I

*Typical preparation of triazine monomer*

A solution of 18.1 parts of acrylyl chloride in 150 parts of diethyl ether is added slowly and with stirring to a mixture of 51.8 parts of

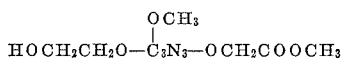

in 150 parts of diethyl ether containing 37 parts of tributyl amine in a suitable reactor equipped with means for stirring and reflux. Upon completion of the addition of the acid chloride, the mixture is refluxed for approximately one-half hour and allowed to cool to room temperature after which it is washed with water to remove the tributyl amine hydrochloride. The ether is removed by evaporation and the ester product is recrystallized from acetone-water mixtures. There is obtained the acrylic ester,

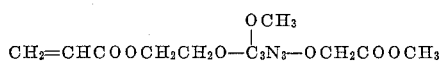

Analyses for carbon, hydrogen, and nitrogen give values which are in close agreement with the theoretical values for the pure compound. Substitution of equivalent quantities of (1) alpha-chloroacrylic chloride, (2) beta-cyanoacrylyl chloride, (3) methacrylyl chloride, (4) monomethyl itaconyl monochloride, (5) monomethyl fumaryl monochloride, and (6) alpha-methoxy acrylyl chloride, respectively, for the acrylyl chloride in the above procedure, yields the corresponding esters which are identified by analyses as in the foregoing procedure to give compounds of the structures, (1) 

(2) 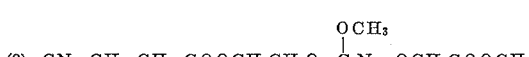

(3) 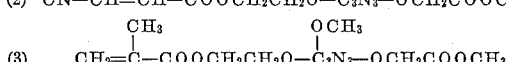

(4) 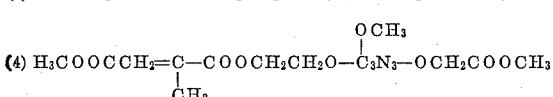

(5) 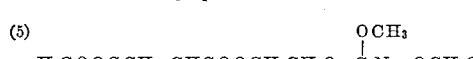

(6) 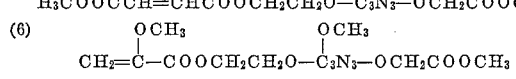

The triazine compounds used in the preparation of the above derivatives have the structure

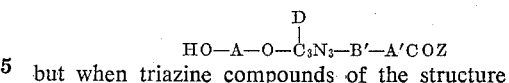

but when triazine compounds of the structure

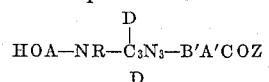

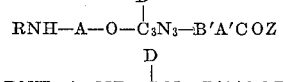

are used they give the corresponding monomers of this invention.

EXAMPLE Ia

A solution of 11.2 parts of itaconic anhydride in 150 parts benzene is added slowly and with stirring to a mixture of 30.6 parts $HOCH_2CH_2NH(C_3N_3) \cdot (NHCH_2COOCH_3)_2$ in 100 parts diethyl ether in a suitable reactor equipped with means for reflux and stirring. Upon completion of the addition of the anhydride, the mixture is refluxed for approximately one-half hour after which it is allowed to cool and is washed with water. There is obtained the itaconic monoester,

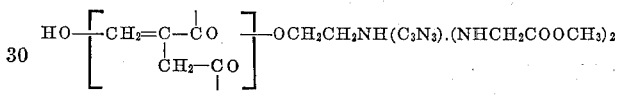

which on analyses for carbon, hydrogen, and nitrogen give values in close agreement with the theoretical values for the pure compounds.

Substitution of an equivalent amount of various other triazinyl intermediates, e.g.

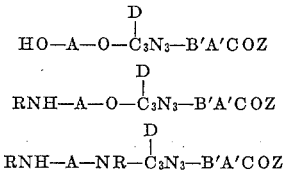

respectively, for that used in the foregoing procedure, gives the corresponding derivatives. Similarly substitution of other dicarboxyl acid anhydrides, for example, 9.8 parts of maleic anhydride for the itaconic acid anhydride, gives the corresponding derivatives of the triazine compounds listed above.

These mono-derivatives are readily converted to alkyl esters by reacting their sodium or potassium salts, in the standard manner, with dimethyl sulfate, diethyl sulfate, or other dialkl sulfates to produce the corresponding methyl, ethyl, or other alkyl esters. This type of ester can also be prepared in the following manner: 16.3 parts of the monomethyl itaconyl monochloride in 50 parts diethyl ether is added slowly and with stirring to 30.6 parts of $HOCH_2CH_2NH(C_3N_3) \cdot (NHCH_2COOCH_3)_2$ in 100 parts of diethyl ether containing 18.5 parts of tributyl amine. Upon completion of the addition of the acid chloride, the mixture is cooled to room temperature and the product washed with water to remove the tributyl amine hydrochloride. The ether is removed by evaporation and the product recrystallized from alcohol-water mixtures. There is obtained the itaconic methyl ester of the triazine, namely

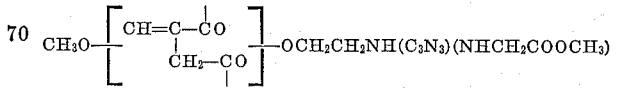

which on analyses for carbon, hydrogen, and nitrogen, give values in close agreement with the theoretical values for the pure compounds.

Substitution of various other ethenoic monoamides or monoesters, or the various triazinyl compounds in the foregoing procedure yields the corresponding esters and amides which are characterized by analyses as described in the foregoing procedure. For example, substitution of an equivalent amount of monomethyl fumaryl chloride for the itaconyl chloride gives the corresponding fumaryl compounds, e.g.

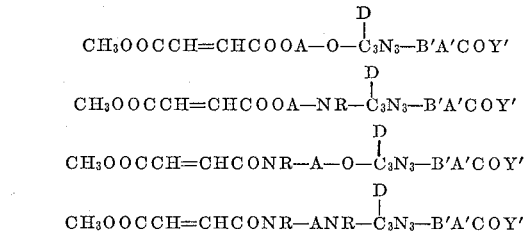

If, instead of 14.85 parts of the monoacid chloride, there is used 15.25 parts of fumaryl dichloride ClOC—CH=CHCOCl with 42.6 parts of

HOCH₂CHNH(C₃N₃)·(OCH₂COOCH₃)₂ with 37 parts tributyl amine, there is obtained the fumaryl derivative

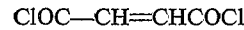
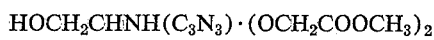

whereas by substitution of the other various diacyl chlorides or by other triazine compounds, the corresponding derivatives are obtained. As previously mentioned one of the acyl groups can be converted to an amide of the grouping, —NR₂, before or after the acid chloride is converted to the triazinyl derivative with the grouping

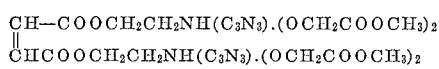

The various other triazine monomers of this invention can be prepared by the foregoing procedures using the appropriate ethenoic and triazine intermediates. For example, various monomers prepared accordingly are identified by the analyses indicated above to have the following formulas:

(a) 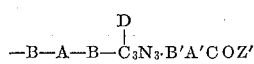

(b) 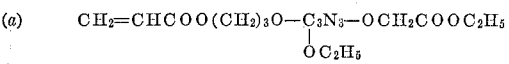

(c) 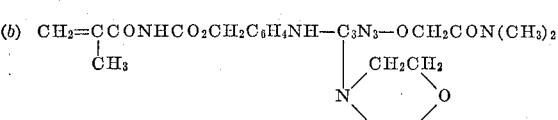

(d) 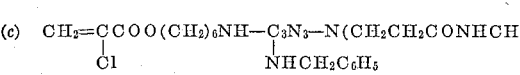

(e) 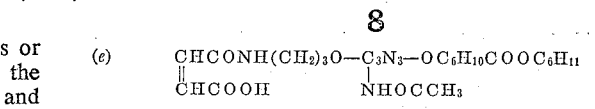

(f) 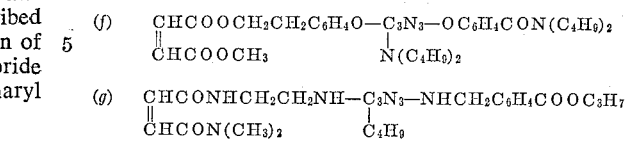

(g) 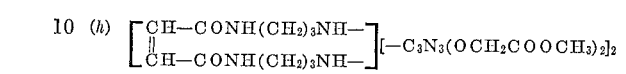

(h) 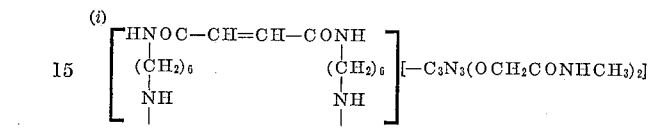

(i) 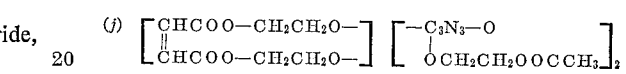

(j) 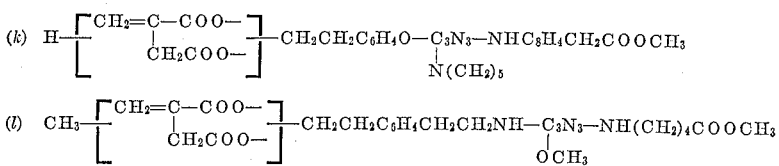

(k) 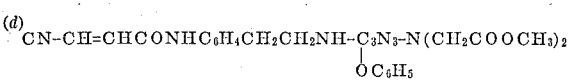

(l) (not visible separately)

(m) 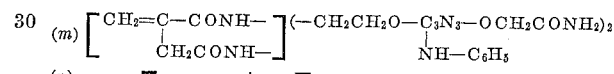

(n) 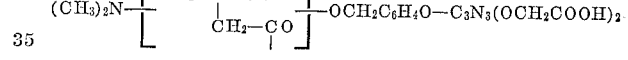

(o) 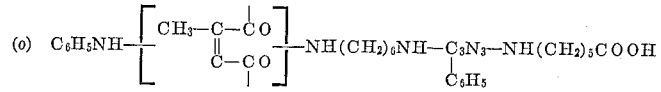

Typical triazinyl intermediates in addition to those shown above that can be used to give monomers of this invention include as examples but are not restricted to:

(1) 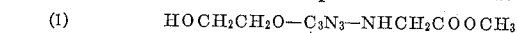

(2) 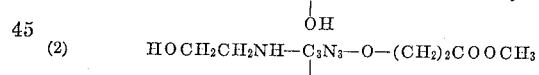

(3) 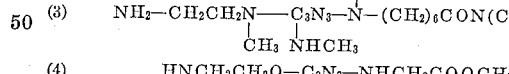

(4) 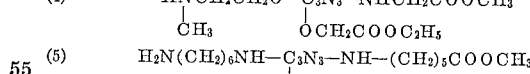

(5) 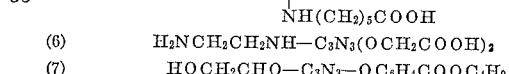

(6) 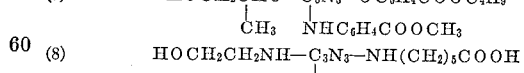

(7) 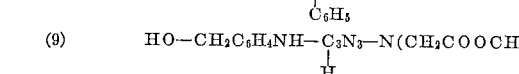

(8) 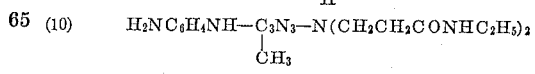

(9) 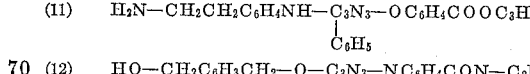

(10) 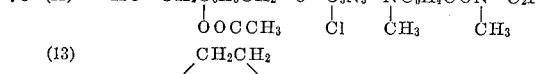

(11) 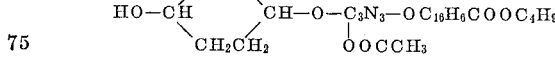

(12) 

(13) 

(14) 
$$NH_2CH \begin{matrix} CH_2CH_2 \\ \diagdown \\ \diagup \\ CH_2CH_2 \end{matrix} CH-O-C_3N_3-O\overset{OOCCH_3}{\underset{OCH_2C_6H_5}{\overset{|}{C_6H_3}}}-COOCH_3$$

(15) 
$$H_2N \begin{matrix} CH_2CH_2 \\ \diagdown \\ \diagup \\ CH_2CH_2 \end{matrix} N-C_3N_3-N \begin{matrix} CH_2CH_2 \\ \diagdown \\ \diagup \\ CH_2CH_2 \end{matrix} CH-CON(CH_2C_6H_5)_2$$
$$\overset{|}{CN}$$

(16)
$$H_2N \begin{matrix} CH_2CH_2 \\ \diagdown \\ \diagup \\ CH_2CH_2 \end{matrix} CH-O-C_3N_3-\overset{OCH_2CH_2C_6H_4COOC_6H_5}{\underset{OCH_2COOCH(CH_3)_2}{\overset{|}{\phantom{X}}}}$$

(17) $HO-CH_2-C_6H_{10}-CH_2-NH-C_3N_3-OC_6H_{10}CON(C_2H_5)_2$
$\phantom{HO-CH_2-C_6H_{10}-CH_2-NH-C_3N_3}\overset{|}{OSO_3C_2H_5}$

(18) $HO-CH_2-CH-O-C_3N_3-NH-C_6H_{10}COOC_2H_5$
$\phantom{HO-CH_2-}\overset{|}{CHOC_2H_5}\phantom{--}\overset{|}{N(CH_2)_5}$ Other methods of preparing the triazine monomers of the invention can be used. For example, the triazine monomers can also be prepared by condensing an ethenoic acid derivative of the formula $$CH_2=C-C(O)-B-A-BH$$
$$\phantom{CH_2=}\overset{|}{X}\phantom{-C(}\overset{|}{Y}$$

with a cyanuric chloride derivative of the formula $$Cl-C_3N_3-B'A'C(O)-Z$$
$$\phantom{Cl-C_3N_3-}\overset{|}{D}$$

in the presence of a hydrohalide acceptor, such as NaOH, to produce triazine monomers by well-known condensation procedures.

The various triazine monomers used hereinafter in the examples have the following structures.

Triazine monomer III:

$$CH_2=CHCOOCH_2CH_2O-C_3N_3(NHCH_2COOCH_3)_2$$

Triazine monomer IV:

$$CH_2=CCOOCH_2CH_2NH-C_3N_3-NHCH_2COOCH_3$$
$$\phantom{CH_2=}\overset{|}{CH_3}\phantom{OOCH_2CH_2NH-C_3N_3-}\overset{|}{OCH_3}$$

Triazine monomer VI:

$$CH_2=CCONHCH_2CH_2NH-C_3N_3(OCH_2COOCH_3)_2$$
$$\phantom{CH_2=}\overset{|}{Cl}$$

Triazine monomer VII:

$$HO-\left[\begin{matrix}CH_2=C-CO\\ \phantom{CH_2=}\overset{|}{\phantom{X}}\\ CH_2-CO\\ \phantom{CH_2=}\overset{|}{\phantom{X}}\end{matrix}\right]-O(CH_2)_3O-C_3N_3-NHCH_2COOCH_3$$
$$\phantom{HO-OOOOOOOOOOOOOOOOOOOOOOOO}\overset{|}{OCH_2COOCH_3}$$

Triazine monomer VIII:

$$HOOCCH=CHCOOCH_2CH_2O-C_3N_3-N(CH_2COOCH_3)_2$$
$$\phantom{HOOCCH=CHCOOCH_2CH_2O-C_3N_3-}\overset{|}{N(CH_3)_2}$$

Triazine monomer IX:

$$CH_3O-\left[\begin{matrix}CH_2=C-CO\\ \phantom{X}\\ CH_2CO\\ \phantom{X}\end{matrix}\right]-NHCH_2CH_2O-C_3N_3-OCH_2CON(CH_3)_2$$
$$\phantom{CH_3O-OOOOOOOOOOOOOOOOOOO}\overset{|}{OCH_3}$$

Triazine monomer X:

$$\left[\begin{matrix}CH-COO-\\ \phantom{X}\\ CH-COO-\end{matrix}\right][-(CH_2)_6O-C_3N_3-O(CH_2)_4CON(CH_3)_2]_2$$
$$\phantom{OOOOOOOOOOOOOO}\overset{|}{N(CH_3)}$$

Triazine monomer XI:

$$C_6H_5NH-\left[\begin{matrix}CH-CO\\ \phantom{X}\\ CH-CO\end{matrix}\right]-NHC_6H_4NH-C_3N_3-NHCH_2C_6H_4CONHC_6H_5$$
$$\phantom{OOOOOOOOOOOOOOOOOOOOOOO}\overset{|}{NHCH_2C_6H_5}$$

Triazine monomer XII:

$$CH-CONHC_6H_4NH-C_3N_3-N(CH_2COOCH_3)_2$$
$$\overset{\|}{CH-COOH}\phantom{OOHC_6H_4NH-}\overset{|}{OC_6H_4OOCCH_3}$$

Triazine monomer XIII:

$$CH_2=CHCONHC_6H_4O-C_3N_3-NHCH_2COOC_4H_9$$
$$\phantom{CH_2=CHCONHC_6H_4O-}\overset{|}{Cl}$$

Triazine monomer XIV:

$$CHCONHCH_2CH_2O-C_3N_3-OCH_2COOCH_2C_6H_5$$
$$\overset{\|}{CHCOOCH_2C_6H_5}\phantom{-C_3N_3-}\overset{|}{NO_2}$$

Triazine monomer XV:

$$CHCONHCH_2CH_2O-C_3N_3-OCH_2CON(CH_3)_2$$
$$\overset{\|}{CHCON(CH_3)_2}\phantom{-C_3N_3-}\overset{|}{OSO_3C_2H_5}$$

Triazine monomer XVI:

$$CH_3-CO(CH_2)_4O-C_3N_3-O(CH_2)_4COOCH_3$$
$$\phantom{CH_3-}\overset{\|}{CHCOOCH_3}\phantom{O-}\overset{|}{O(CH_2)_4CON(CH_3)_2}$$

EXAMPLE II

*Homopolymerization of triazine monomer*

One hundred parts of the monomer prepared in Example I is slowly added over a period of less than an hour to 1000 parts of distilled water at 30–50° C. containing dissolved therein one part of ammonium persulfate, one part of sodium bisulfite and 0.5 part of sodium dodecylbenzene sulfonate. The reaction is continued for six hours, at which time a yield of about 90 percent solid polymer is precipitated. The resulting polymer has a molecular weight over 10,000. Some of the polymer is dissolved in N,N-dimethyl acetamide and a film cast from the resultant solution. When this film is dyed according to the technique described in Example III hereof, the film shows a dense and deep shade of blue.

Other monomers of this invention are similarly polymerized.

The proportions of the triazine in the polymerization products of the invention may vary over a wide range, ranging from all or substantially all triazine down to very small amounts of triazine monomer such as may be employed in acrylonitrile polymers to impart dye susceptibility thereto. Although even smaller amounts are somewhat effective, the improvement in susceptibility of acrylonitrile copolymers to dyes becomes particularly noticeable when the triazine monomer content of the copolymer is about 0.1 percent and the susceptibility increases as the amount of triazine monomer is increased. Ordinarily sufficient improvement in dye susceptibility is obtained with amounts of the triazine monomer ranging up to about 10 or 15 percent but may be advantageous for reasons such as in the preparation of ion-exchange polymers or as additives to improve dyeing properties to have a major proportion of triazine monomer in the acrylonitrile copolymer. In such cases, the concentration can range up to or approaching 100 percent. Within these proportions acrylonitrile copolymers of the invention show great affinity toward many dyes especially basic, acidic, vat and cellulose acetate dyes.

In addition to the improvements effected in the resulting copolymers, the use of the aforesaid triazinyl derivatives has certain other advantages over the use of the corresponding acids. For example, these triazinyl derivatives are more soluble in acrylonitrile than the acids. Thus it is generally easier to get complete copolymerization of the triazine monomer with acrylonitrile in solution, emulsion and suspension polymerizations.

The acrylonitrile copolymers discussed herein are soluble in N,N-dimethyl acetamide (DMA), N,N-dimethyl formamide (DMF), butyrolactone, ethylene carbonate and a number of similar solvents, used alone or in conjunction with N,N-dimethyl cyanamide, N,N-dimethyl cyanoacetamide, N,N-dimethyl methoxy-acetamide, methylene dinitrile, methylene di-thiocyanate, formyl caprolactam, formyl morpholine, tetra-methylene sulfone, etc. N,N-dimethyl methyl urethane of the formula $$(CH_3)_2NCOOCH_3$$

ethylene carbamate, N-methyl-2-pyrrolidone, etc. may also be used as solvents either by themselves or with the secondary solvents mentioned above. Nitroalkanes, such as nitro-methane, may be used as solvents for such copolymers having no more than about 85 percent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength such as vinyl chloride, may often be dissolved in acetone or mixtures of acetone or acetone with water and solvents of the above types.

EXAMPLE III

Five polymers of acrylonitrile are prepared from the following monomer composition containing as the triazine monomer that identified above as Triazine Monomer III.

| Polymer | Acrylonitrile, parts | Triazine monomer, parts |
| --- | --- | --- |
| A | 100 | 0.0 |
| B | 99.9 | 0.1 |
| C | 95 | 5.0 |
| D | 90 | 10.0 |
| E | 80 | 20.0 |

The 100 parts of monomer or monomer mixture is, in each case, slowly added over a period of less than an hour to 1000 parts of distilled water at 30–50% C containing dissolved therein one part of ammonium persulfate, one part of sodium bisulfite and 0.5 part of sodium dodecylbenzene sulfonate. The reaction is continued for 6 hours, at which time a yield of about 90 percent solid polymer is precipitated. The resulting polymers have molecular weights over 10,000. Each polymer is dissolved in N,N-dimethyl acetamide and a film cast from each solution.

A water solution of methylene blue dye (a basic dye) is prepared by making a paste of the dye and then diluting to a 1 percent by weight dye solution. This type solution is kept boiling for one hour while the aforementioned films are immersed therein for one hour. The dyed films are then removed and separately subjected to washing with boiling water for one hour, the boiling water being changed frequently to remove the desorbed dye. The unmodified polyacrylonitrile film shows only a light tint, whereas the copolymers are dense and deep shade. Identical films, cold-drawn and heat-treated, show dyeing characteristics similar to the undrawn films.

Fibers are spun from the same N,N-dimethyl acetamide solutions either by dry spinning or by wet spinning, into glycerine baths. The fibers are substantially freed from solvent and dried. After cold-drawing the dried fibers 600–900 percent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers.

Instead of the specific triazine monomer used in this example, the various other related triazine monomers as disclosed above, can be used with similar results.

EXAMPLE IV

Five polymers of acrylonitrile are prepared from the following monomer compositions using as the triazine monomer that identified above as Triazine Monomer IV:

| Polymer | Acrylonitrile, parts | Triazine monomer, parts |
| --- | --- | --- |
| A | 100 | 0.0 |
| B | 99.9 | 0.1 |
| C | 95 | 5.0 |
| D | 90 | 10.0 |
| E | 80 | 20.0 |

To 900 parts of water, adjusted to a pH of about three in a suitable reactor, is added 1 part sodium dodecyl benzene sulfonate, 1.0 part of ammonium persulfate, 0.5 part of sodium bisulfite, and 100 parts of monomer or monomer mixture.

The reactor is then flushed with deoxygenated nitrogen and heated with agitation to 50° C. for 24 hours. Steam is introduced into the reactor to remove unpolymerized monomers from the mixture. A small amount of aluminum sulfate is added to the mixture and the polymer in each case is isolated by filtration.

The polymer is then washed with water and with methyl alcohol. A portion of the polymer is dissolved in ethylene carbonate and a film cast from the solution. The film is washed entirely free of solvent and stretched at a ratio of about 8:1 in a glycerine bath at 135–145° C. The film is then washed with water and dyed in a bath containing 0.05 part of 1,5-diamino-4,8-dihydroxyanthra-quinone-3-sulfonic acid, 0.03 part sulfuric acid and 50 parts water (50:1 bath-film ratio) at boiling temperature for one hour. The film is then removed and washed with water and scoured for 15 minutes in a 0.4 percent soap solution at 85° C. Whereas the unmodified polyacrylonitrile has little or no color, all of the copolymers are dyed a deep blue shade.

Fibers are spun from the same solutions either by dry spinning, or by wet spinning. The fibers are substantially free from solvent and dried. After cold-drawing the dried fibers 600–900 percent at 120–145° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, dimethylsulfone, butyrolactone, formyl morpholine, etc.

Instead of the monomer of the preceding example, the various other triazine monomers can be used as embraced by the formula given above, such as, for example, those identified above as Triazine Monomers X–XVI inclusive.

EXAMPLE V

Five parts of the copolymers fiber D of Example III are dyed to a green shade using the vat color dimethoxy-dibenzanthrone at 70° C. in a bath containing 0.5 part of dye, 0.25 part sodium hydroxide, 0.5 part sodium hydrosulfite and 100 parts of water (20:1 bath-fiber ratio). After the first 15 minutes of heating 0.25 part of Glauber's salt is added. The sample fibers are then oxidized in a 0.5 percent sodium dichromate-1.0 percent acetic acid aqueous solution at 70° C. for 30 minutes in a 20:1 bath-fiber ratio. The dyed fibers are scoured in a 0.5 percent boiling soap solution. A sample of yarn prepared from the unmodified polyacrylonitrile and dyed under the same conditions results in a light shade of color.

When 1,5 - di - p - anisoylamino - 4,8 - dihydroxy-anthraquinone is used as the vat dye, the fiber is dyed a strong violet color.

EXAMPLE VI

The procedure of Example III is repeated for the polymerization of the following monomer compositions using as the triazine monomer that identified above as Triazine Monomer VI:

| Polymer | Acrylonitrile, parts | Vinyl chloride, parts | Triazine monomer, parts | Copolymer soluble in— |
| --- | --- | --- | --- | --- |
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | NO$_2$ME. |
| E | 57 | 40 | 3 | NO$_2$ME. |
| F | 37 | 60 | 3 | Acetone. |

Sometimes copolymers D and E, when dissolved in nitromethane may have gelled, partially dissolved particles known as fisheyes. In such cases, the solubility may be improved by the addition of small amounts of materials which are good solvents for acrylonitrile polymers, such as butyrolactone, dimethyl formamide, dimethly acetamide, dimethylsulfone, etc. In addition, certain materials which are relatively poor solvents for polyacrylonitrile, such as diethyl formamide, diethyl acetamide, diethyl propionamide, etc., may be added to improve the solubility. Also, when acetone solutions of copolymer F contain gelled particles, clarification of the solution may be effected by the addition of nitromethane diethyl formamide, diethyl acetamide, etc.

Dyeing tests of these copolymers show improvements in dyeing susceptibility similar to those of Example III.

Instead of this specific triazine monomer, other triazine monomers, such as identified above as Triazine Monomers X–XVI inclusive, can be used with similar results.

EXAMPLE VII

The procedure of Example III is repeated for the polymerization of the following monomer compositions containing as the triazine monomer that identified above as Triazine Monomer VII:

| Polymer | Acrylonitrile, parts | Stryene, parts | Triazine monomer, parts |
| --- | --- | --- | --- |
| A | 88.0 | 7 | 5.0 |
| B | 78.0 | 17 | 5.0 |
| C | 68.0 | 27 | 5.0 |
| D | 58.0 | 37 | 5.0 |

Dyeing tests of these copolymers show improvements in dye susceptibility similar to Example III. In place of styrene, various styrene derivatives may be used, such as alpha-methyl-styrene; nuclear-substituted chloro-styrenes, i.e., ortho-, meta-, and para-chloro-styrenes, dichloro-styrenes, for example, the 2,3-, 2,4-, 2,5-, 2,6-, 3,4-, and 3,5-dichloro-styrenes, trichloro styrenes; cyano-styrenes, such as ortho-, meta-, and para-cyano-styrenes, dicyano-styrenes; nuclear-substituted alkyl-styrenes, such as mono- and dimethyl-styrenes, mono- and di-ethyl-styrenes, mono- and di-isopropyl-styrenes; aryl-substituted styrenes, i.e., para-phenyl styrene, etc., cycloaliphatic substituted styrenes, such as para-cyclohexyl-styrene; fluoro-styrenes, such as ortho-, meta-, para-fluoro-styrene difluoro-styrenes, etc.; trifluoromethyl-styrenes, such as ortho-, meta-, and para-trifluoromethyl-styrenes, di-(trifluoromethyl)-styrenes, and various other styrenes or mixtures of any number of these with each other or with styrene.

Instead of this specific triazine monomer, various other triazine monomers, such as those identified above as Triazine Monomers X–XVI inclusive, can be used with similar results.

EXAMPLE VIII

The procedure of Example III is repeated for the polymerization of the following monomer compositions containing as the triazine monomer that identified above as Triazine Monomer VIII:

| Polymer | Acrylonitrile, parts | Vinylidene chloride, parts | Triazine monomer, parts | Copolymer soluble in— |
| --- | --- | --- | --- | --- |
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

With the above vinylidene chloride copolymers and similar copolymers having a total of acrylonitrile and divinylidene chloride of at least 85 percent in the polymer molecules, only the more active solvents, such as butyrolactone, N,N-dimethyl acetamide, N,N-dimethyl formamide, etc., can be used as solvents. The above copolymers dye more readily and thoroughly than similar copolymers containing no triazine monomer groups.

In addition to copolymerization such as described above, it is also advantageous to polymerize the triazine monomers in the presence of preformed polymers and copolymers, for example polymers and copolymers of acrylonitrile. It is particularly advantageous, and excellent results are obtained, when one or more triazine monomers is added to a polymerization system in which acrylonitrile, for example, has just been homo- or co-polymerized and in which the catalyst has not yet been deactivated and the polymer not yet separated therefrom, and polymerization is contained so as to polymerize or copolymerize the triazine monomers with the still-active polymer of acrylonitrile, etc. Good results are also obtained even when the prepolymer has been separated from the polymerization system and is resuspended in a polymerization system in which the triazine monomer subsequently is polymerized in its presence. The proportions and other conditions in both cases are similar to those used in various examples shown herein. For example, excellent results are obtained when Examples III, IV, VI, VII and VIII are repeated except that the triazine monomer is withheld and is added one hour before the end of the polymerization period. Excellent dyeing results in each case when tested according in Example V.

EXAMPLE IX

The procedure of Example III is repeated for the polymerization of the following monomer composition containing as the triazine monomer that identified above as Triazine Monomer IX:

| Polymer | Acrylonitrile, parts | Vinylidene chloride, parts | Vinyl chloride, parts | Triazine monomer, parts |
| --- | --- | --- | --- | --- |
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymer products show dye susceptibility similar to the copolymers of Example III.

Instead of this specific triazine monomer various other triazine monomers, such as identified above as Triazine Monomers X–XVI inclusive, can be used with similar results.

Instead of copolymerizing the above esters with the acrylonitrile, the esters may be polymerized independently as shown in Example II to produce homopolymers and the prepared polymer used to modify polyacrylonitrile or other acrylonitrile copolymers. The acrylonitrile polymers may be blended with up to 10 percent or more of the modifying polymers without serious loss in the physical or chemical properties of the resulting dyed structures, or may be added to acrylonitrile monomer and the mixture polymerized. The following example is illustrative.

EXAMPLE X

A 10 percent solution in dimethyl formamide is prepared from the polymer made in Example II and is added to a dimethyl formamide solution of polyacrylonitrile, containing 20 percent polymer so that a composition consisting of 90 parts of polyacrylonitrile and 10 parts of the above polymer is obtained. The solution is heated to 130° C., after which the solution is filtered. Films and fibers prepared from this mixture are dyed in accordance with the process of Example III, and satisfactory dyed, shaped articles are obtained. The unmodified polyacrylonitrile without the addition of the homopolymer shows little or no dye retention.

Instead of using the homopolymer of this example, copolymers of the triazine monomers, including those with other monomers, such as polymers D and E of Example IV, may be used as modifiers for the homopolymers or copolymers of acrylonitrile. For example, polymer E of Example IV, which consists of 80 parts of acrylonitrile and 20 parts of a triazine monomer has excellent compatibility with polymers of acrylonitrile and has little or no detrimental effect on the physical properties of oriented fibers and films. In many cases, it is desirable to use as modifiers copolymers which have even a higher ratio of the triazine monomer, as for example, 50 to 70 parts of the triazine monomer copolymerized with acrylonitrile or methacrylonitrile. In other cases, the copolymers of the triazine monomer with other monomers are satisfactory such as, for example, copolymers of styrene, vinyl chloride, vinylidene chloride, alpha-methylstyrene, vinylidene cyanide, etc.

When it is desired to modify an acrylonitrile copolymer, such as the copolymer of acrylonitrile and styrene or the copolymers of acrylonitrile and other copolymerizable ethylenic compounds, it is usually desirable to use as modifiers copolymers containing the same structural units as are present in the acrylonitrile copolymer. Thus as there are present in the acrylonitrile copolymer, structural units derived from the acrylonitrile and styrene, it is desirable to have present in the modifying copolymer structural units derived from styrene in addition to those derived from acrylonitrile and the triazine monomer. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

The polymerization products of the triazine monomers of the present invention have in the polymer molecule a plurality of repeating units of the formula given above and will contain additional repeating units of the formula

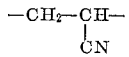

when the triazine monomer is copolymerized with acrylonitrile.

In addition, the copolymers may contain any number of repeating units of the type obtained by the copolymerization of the triazine monomer or a mixture of acrylonitrile and the triazine monomer with one or more copolymerizable ethylenic compounds, such as, for example, vinylidene chloride, vinyl chloride, styrene, alpha-methylstyrene, methacrylonitrile, fumaro-nitrile, beta-cyano-acrylamide and methyl beta-cyano-acrylate, etc.

As previously indicated, the solvent resistance of such copolymers as contain one or more monomer units in addition to those formed by the acrylonitrile and the triazine monomer is affected by the type and proportion of copolymerizing monomer or monomers used to replace part of the acrylonitrile. For example, copolymers containing small amounts of the triazine monomer units may contain various proportions of such monomer units as obtained from vinylidene chloride, methacrylonitrile, fumaro-nitrile, and beta-cyano-acrylamide without considerable reduction in solvent resistance. Replacement of acrylonitrile units in the copolymers by vinyl chloride, styrene and alpha-methylstyrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example the tensile strength of an acrylonitrile triazine monomer type copolymer will decrease much more when a monomer having relatively weak secondary bonding forces, such as styrene or ethylene is used to replace part of the acrylonitrile than when a monomer having relatively strong bonding forces, such as methacrylonitrile, fumaronitrile, beta-cyano-acrylamide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which may also be present in the polymerizable masses for copolymerization with the esters used in the practice of this invention include one or more of the following: acrylates, e.g., methyl acrylate; methacrylates, e.g., methyl methacrylate; acrylamides; methacrylamides; vinyl esters, such as vinyl acetate; maleates, such as dimethyl and diethyl maleates; fumarates, such as dimethyl and diethyl fumarates; itaconic diesters, such as dimethyl and diethyl itaconates; itaconamide; vinyl halides, such as vinyl fluoride, vinylidene cyanide, vinylidene fluoride, tetrafluoroethylene, trifluorochloroethylene; vinyl aryls, such as vinyl naphthalenes and substituted styrenes as listed in Example VII, etc.

The polymerization products of this invention may be prepared by various polymerization systems, such as emulsion, suspension, mass and solution polymerizations. In addition to the monomers, the polymerizable mass may also contain other materials such as catalysts, e.g., peroxides, such as benzoyl peroxide, naphthyl peroxides, phthalyl peroxide, tertiary-butyl hydroperoxide, hydrogen peroxide, cyclohexyl hydroperoxide, tertiary-butyl perbenzoate, etc., azo-catalysts, persulfates, such as ammonium persulfate, etc., solvents, suspension or emulsion media, emulsifying agents, suspension agents, plasticizers, lubricants, etc.

For use in the preparation of shaped articles, the polymerization products of this invention have molecular weights preferably of at least about 10,000. However, polymerization products of molecular weights less than 10,000 may be used for other purposes, such as impregnants, solvent resistant coatings, etc. The molecular weight of the polymerization products is dependent on the concentrations of the monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristics of the composition of the material being X-rayed. In fibers or films the orientation usually follows the direction of drawing or stretching so that the orientation is parallel to the fiber axis or a major surface.

Useful fibers can be made from the solutions of the copolymers of this invention by dry spinning, as in the preparation of cellulose acetate fibers, or by wet spinning, as in the preparation of viscose rayon. In wet spinning, the solution of copolymer can be spun into a substance which is non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc., can be used as a precipitating bath for N,N-dimethyl acetamide, dimethyl sulfone, butyrolactone and other solvent compositions of these copolymers. The extruded fibers, from which substantially all of the solvent has been removed in the spinning step, about 1–10 percent remaining in the shaped articles, can then be cold-drawn about 100–900 percent, preferably about 300–600 percent; and the drawn fiber heat-treated, usually at substantially constant length, at about 100–160° C. to effect further crystallization and the removal of the remaining solvent. The term "heat-treated," as used herein, refers to the application of heat to an object, usually at a controlled temperature and usually by means of the medium surrounding the object.

Many of the acrylonitrile copolymers of this invention can be molecularly oriented, especially if there is no more than 15 percent triazine monomer in the polymer molecule. This is true when the major portion of the copolymer is acrylonitrile, for example, 85 percent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and the triazine monomer, the proportion of acrylonitrile in the copolymers can be much less than 85 percent without destroying the capacity for molecular orientation. Molecularly oriented, cold-drawn, shaped articles of particular usefulness are prepared from copolymer compositions containing the polymer molecules 60–99.9 percent acrylontrile, 0.1–15 percent, advantageously 0.1–5 percent, triazine monomer, with or without one or more monomers of the class consisting of vinylidene chloride, vinylidene cyanide, vinyl chloride, styrene, alpha-methyl-styrene, methacrylonitrile, fumaronitrile, beta-cyanoacrylamide and methyl beta-cyano-acrylate, the effects of the presence of the monomers of this class being noticeable when the monomer is present in the polymer molecule in amounts of 1 percent more.

For example, cold-drawn fibers of excellent properties are prepared from copolymers containing about 60–98.9 percent acrylontrile, about 0.1–5 percent triazine monomer and about 1–39.9 percent or one or more compounds selected from the class consisting of vinyl chloride, vinylidene chloride, styrene, alpha-methyl-styrene, methacrylonitrile, fumaronitrile, beta-cyano-acrylamide and methyl beta-cyano-acrylate.

The copolymerization products of this invention show great affinity for the acetate, basic, acidic, and vat dyes. The cellulose acetate dyes which are effective with these polymerization products are mainly amino-anthraquinone derivatives. The basic dyestuffs toward which these polymerization products show great affinity are preferably those which contain amide, alkyl-amido, or ammonium groups, such as —NH$_2$—N(CH$_3$)$_2$, —N(C$_2$H$_5$)$_2$, —NHC$_6$H$_5$, —NCH$_3$)$_3$OH, etc, and which may also be used in the form of their salts, i.e., the hydrochlorides, sulfates or oxalates. Some of these basic dyes are Methylene Blue, Rhodamine B, Indamine Blue, Auramine, Meldola's Blue, Chrysoidine Y, Acridine Yellow, Magenta, Crystal Violet, Thioflavine T, Saffranine and Bismarck Brown. The cellulose acetate dyes which are effective with these polymerization products are mainly amino-anthraquinone derivatives, basic azo compounds and other basic substances, such as the Duranol, Dispersol, Sericol, etc. dyestuffs. A number of other acidic dyes that can be used are anthranilic acid→1-(4' sulfophenyl), 3-methyl-5-pyrazolone, 1,5-diamino-4,8 - dihydroxyanthraquinone-3-sulfonic acid; 1 - aminonaphthalene-4-sulfonic acid→alphanaphthol-4-sulfonic acid; the sodium salt of sulfanilic acid→aniline→2-benzoyl-amino-5-naphthol-7-sulfonic acid; the sodium salt of 4,4'-diaminostilbene 2,2'-disulfonic acid⇌(phenol)$_2$ ethylated; 1,5-diamino - 4,8 - dihydroxyanthraquinone - 3 - sulfonic acid; dye prepared by diazotizing 1-aminonaphthalene-4-sulfonic acid and coupled with alpha-naphthol-4-sulfonic acid; the sodium salt of (m-aminobenzoic acid→o-anisidine)phosgenated; the sodium salt of 2-naphthol 6,8 - disulfonic acid←benzidine→phenol; ethylated dimethoxy-dibenzanthrone; and 1,5-di-p-anisoylamino-4,8-dihydroxyanthraquinone.

From the molecularly orientable copolymers of this invention fibers can be prepared having improved dyeing properties, low shrinkage in boiling water, sometimes as low as 3 to 5 percent or less of the cold-drawn or stretched article, good heat resistance, and tensile strength in order of 4 to 6 grams per denier. Moreover, these properties make the fibers desirable in the manufacture of hosiery and for such all-purpose fabrics as used for blouses, shirts, suits, etc.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:
1. As a new composition of matter, a compound having the formula

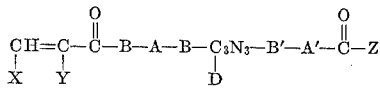

wherein X is selected from the class consisting of hydrogen, cyano, —C(O)OR, —C(O)NR'$_2$, and

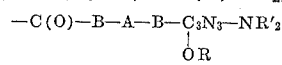

groups; Y is selected from the class consisting of hydrogen, alkyl groups of no more than six carbon atoms, and when X is hydrogen, Y can also be selected from the group consisting of chloro, fluoro, bromo, iodo, —CH$_2$C(O)OR, —CH$_2$C(O)NR'$_2$, and

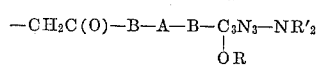

groups; B is selected from the class consisting of oxygen and —N(R'')— radicals; A is a divalent hydrocarbon radical having at least two carbon atoms between said valencies; and when that B to which the

group is attached is oxygen, that part of A to which B is attached is aliphatic; R is selected from the class consisting of hydrogen and monovalent hydrocarbon radicals; R' is selected from the class consisting of hydrogen, monovalent hydrocarbon radicals, divalent hydrocarbon radicals representing two R''s with both valencies attached to the N, and divalent hetero groups representing two R''s with both valencies attached to the N; R'' is selected from the class consisting of hydrogen, monovalent hydrocarbon radicals, divalent hydrocarbon radicals in which the second valency is connected to A of the formula, and divalent hydrocarbon radicals in which the second valency is connected to the other B group when the latter also represents —N(R'')—; C$_3$N$_3$ represents the symmetrical triazine nucleus; B' is selected from the class consisting of B and

groups; A' is a divalent hydrocarbon radical; Z is selected from the class consisting of OR and NR'$_2$; D is any monovalent group not containing a polymerizable ethylenic group; and hydrocarbon groups of A, R, R', and R'' can have substituents thereon selected from the class consisting of chloro, fluoro, alkoxy, aryloxy and acyloxy groups.

2. A compound of claim 1 having the formula $$CH_2=CHCOO(CH_2)_3O-C_3N_3-OCH_2COOC_2H_5$$
$$\qquad\qquad\qquad\qquad\qquad\quad |$$
$$\qquad\qquad\qquad\qquad\qquad OC_2H_5$$

3. A compound of claim 1 having the formula $$CH_2=CHCOOCH_2CH_2O-C_3N_3(NHCH)_2COOCH_3)_2$$

4. A compound of claim 1 having the formula $$CH_2=CCOOCH_2CH_2NH-C_3N_3-NHCH_2COOCH_3$$
$$\quad\ |\qquad\qquad\qquad\qquad\qquad\quad |$$
$$\ CH_3\qquad\qquad\qquad\qquad\qquad OCH_3$$

5. A compound of claim 1 having the formula $$HOOCCH=CHCOOCH_2CH_2O-C_3N_3-N(CH_2COOCH_3)_2$$
$$\qquad\qquad\qquad\qquad\qquad\qquad\quad |$$
$$\qquad\qquad\qquad\qquad\qquad\qquad N(CH_3)_2$$

6. A cold-drawn fiber having molecular orientation, said fiber comprising a copolymer of about 60–98.9 percent by weight acrylonitrile, about 0.1 to 5 percent by weight of a compound of claim 1, and about 1 to 39.9 percent by weight of a compound selected from the class consisting of vinyl chloride, vinylidene chloride, styrene, alpha-methyl-styrene, methacrylonitrile, fumaronitrile, beta-cyano-acrylamide, and methyl-beta-cyano acrylate.

7. A polymerization product having in the polymer molecule a plurality of repeating units having the formula $$\begin{array}{cc} X & Y \\ | & | \\ -CH-C- \\ & | \\ & CO \qquad\qquad O \\ & | \qquad\qquad\ \ \| \\ & B-A-B-C_3N_3-B'-A'-C-Z \\ & | \\ & D \end{array}$$

wherein X is selected from the class consisting of hydrogen, cyano, —C(O)OR, —C(O)NR'$_2$, and $$-C(O)-B-A-B-C_3N_3-NR'_2$$
$$\qquad\qquad\qquad\qquad\quad |$$
$$\qquad\qquad\qquad\qquad OR$$

groups; Y is selected from the class consisting of hydrogen, alkyl groups of no more than six carbon atoms, and when X is hydrogen, Y can also be selected from the group consisting of chloro, fluoro, bromo, iodo, —CH$_2$C(O)OR, —CH$_2$C(O)NR'$_2$, and $$-CH_2C(O)-B-A-B-C_3N_3-NR'_2$$
$$\qquad\qquad\qquad\qquad\qquad\ |$$
$$\qquad\qquad\qquad\qquad\qquad OR$$

groups; B is selected from the class consisting of oxygen and —N(R'')— radicals; A is a divalent hydrocarbon radical having at least two carbon atoms between said valencies; and when that B to which the $$\begin{array}{c} O \\ \| \\ -C- \end{array}$$

group is attached is oxygen, that part of A to which B is attached is aliphatic; R is selected from the class consisting of hydrogen and monovalent hydrocarbon radicals; R' is selected from the class consisting of hydrogen, monovalent hydrocarbon radicals, divalent hydrocarbon radicals representing two R''s with both valencies attached to the N, and divalent hetero groups representing two R''s with both valencies attached to the N; R'' is selected from the class consisting of hydrogen, monovalent hydrocarbon radicals, divalent hydrocarbon radicals in which the second valency is connected to A of the formula, and divalent hydrocarbon radicals in which the second valency is connected to the other B group when the latter also represents —N(R'')—; C$_3$N$_3$ represents the symmetrical triazine nucleus; B' is selected from the class consisting of B and $$\begin{array}{c} \qquad\quad O \\ \qquad\quad \| \\ -N-A'-C-Z \end{array}$$

groups; A' is a divalent hydrocarbon radical; Z is selected from the class consisting of OR and NR'$_2$; D is any monovalent group not containing a polymerizable ethylenic group; and hydrocarbon groups of A, R, R', and R'' can have substituents thereon selected from the class consisting of chloro, fluoro, alkoxy, aryloxy and acyloxy groups.

8. A polymerization product of claim 7, also having in the polymer molecule a plurality of repeating units having the formula $$\begin{array}{c} -CH_2-CH- \\ | \\ CN \end{array}$$

obtained by preparing the polymerization product in a copolymerizable mixture containing acrylonitrile and a compound of claim 1.

9. A polymerization product of claim 8 in which said repeating units of the formula $$\begin{array}{c} -CH_2-CH- \\ | \\ CN \end{array}$$

comprise about 50–99.9 percent by weight and the repeating units of the repeating unit formula of claim 7 comprise about 0.1–50 percent by weight of said polymerization product.

10. A shaped article comprising the polymerization product of claim 8, said polymerization product having a molecular weight of at least 10,000.

11. A mixture comprising a polymerization product of claim 7 and a polymer of acrylonitrile.

References Cited by the Examiner
UNITED STATES PATENTS 3,153,015  10/1964  D'Alelio _____ 260—78
3,154,523  10/1964  D'Alelio _____ 260—78

SAMUEL H. BLECH, *Primary Examiner.*

J. WHITE, *Assistant Examiner.*

UNITED STATES PATENT OFFICE
CERTIFICATE OF CORRECTION

Patent No. 3,271,478                                September 6, 1966

Gaetano F. D'Alelio

It is hereby certified that error appears in the above numbered patent requiring correction and that the said Letters Patent should read as corrected below.

Column 19, line 13, for "$CH_2=CHCOOCH_2CH_2O\text{———}C_3N_3(NHCH)_2COOCH_3)_2$" read -- $CH_2=CHCOOCH_2CH_2O\text{-}C_3N_3(CNHCH_2COOCH_3)_2$ --.

Signed and sealed this 1st day of August 1967.

(SEAL)
Attest:

Edward M. Fletcher, Jr.                            EDWARD J. BRENNER
Attesting Officer                                       Commissioner of Patents